Feb. 5, 1957

R. R. DUNBAR 2,780,468

ADJUSTABLE CHUCK ADAPTER

Filed Sept. 22, 1954

INVENTOR.
Robert R. Dunbar
BY
Frease & Bishop
ATTORNEYS

Feb. 5, 1957     R. R. DUNBAR     2,780,468
ADJUSTABLE CHUCK ADAPTER
Filed Sept. 22, 1954     4 Sheets-Sheet 2

INVENTOR.
Robert R. Dunbar
BY Frease & Bishop
ATTORNEYS

Feb. 5, 1957 R. R. DUNBAR 2,780,468
ADJUSTABLE CHUCK ADAPTER
Filed Sept. 22, 1954 4 Sheets-Sheet 3

INVENTOR.
Robert R. Dunbar
BY Frease & Bishop
ATTORNEYS

Feb. 5, 1957  R. R. DUNBAR  2,780,468
ADJUSTABLE CHUCK ADAPTER
Filed Sept. 22, 1954  4 Sheets-Sheet 4

INVENTOR.
Robert R. Dunbar
BY
Frease & Bishop
ATTORNEYS ns a figure showing X"# United States Patent Office 2,780,468
Patented Feb. 5, 1957

2,780,468
ADJUSTABLE CHUCK ADAPTER

Robert R. Dunbar, Massillon, Ohio

Application September 22, 1954, Serial No. 457,592

20 Claims. (Cl. 279—16)

My invention relates to improvements in adjustable tool mounting adapters and more specifically to an adapter for use between the spindle or other mounting portion of a machine tool and any chuck, mounting plate or other attachment therefor, for acquiring and maintaining alignment of a workpiece so that it will be true both as to concentricity and parallel alignment.

Most machine tools which use chucks or other attachments mounted thereon to hold a workpiece, now use the chuck mounted directly to the mounting portion of the machine tool, such as, for instance, a lathe. In such cases, one of two types of chucks have been used, which types of chucks have been generally classified as fixed center or universally adjustable chucks.

Fixed center chucks usually include three or four radially adjustable jaws, which jaws may be adjusted radially inwardly or outwardly only in unison. These jaws, therefore, adjust to the same or a fixed center every time, which center point is determined by the accuracy of the original fabrication of the chuck.

One of the principal difficulties with fixed center chucks is that it is difficult to originally fabricate such chucks so that the jaws will closely center the workpiece held therein. This is true particularly where extremely close tolerances are required, say a few ten-thousandths.

An additional difficulty with fixed center chucks is that a small amount of wear on the jaws or the mechanism which moves the jaws radially inwardly and outwardly will greatly change the center point to which the jaws close. In this type of chuck, although it is usually impossible to fabricate them exact enough so that the workpiece will be in radial alignment, it is usually possible to fabriacte them so that the workpiece will be in parallel alignment. Thus, with a fixed center chuck, radial alignment, particularly to extremely close tolerances, is impossible to maintain, whereas parallel alignment can usually be maintained.

Universally adjustable chucks usually also contain three or four radially adjustable jaws. In this case, however, the jaws are each separately radially adjustable so that it is possible to bring a workpiece in almost perfect radial alignment.

One of the principal difficulties with universally adjustable chucks is that, although they are adjustable for radial alignment, it is difficult to construct them so that parallel alignment is obtained in every case. Further, in the case where a group of workpieces are being fabricated which require the jaws of the chuck to maintain every workpiece in the same degere of eccentricity, it is necessary to readjust the jaws every time a different workpiece is to be affixed therein.

Thus, with a universally adjustable chuck, it is possible to maintain very close radail alignment but impossible in every case to maintain parallel alignment. Such a chuck as well, lacks other advantageous features which are desirous in a chuck for modern manufacturing.

For the reason that certain difficulties are encountered with both the fixed center and universally adjustable chucks, it is desirous to have some means to eliminate these difficulties. The ideal combination to solve such difficulties is to use a fixed center chuck which maintains parallel alignment, but to have such chuck radially adjustable to obtain perfect radial alignment or any degree of eccentricity desired. It is, therefore, desirous to use an adapter between the machine tool mounting portion and the fixed center chuck.

Some such adapters have heretofore been provided, but all have certain difficulties which make them impractical for modern machine tool work. One of the principal difficulties with these prior adapters is that they are difficult to adjust since they require heavy clamping bolts to draw them up in parallel alignment and maintain them in adjusted position. Further, it is frequently the case where very fine adjustment is required that merely the tightening of these clamping bolts will change the adjustment and move the chuck out of the desired radial alignment.

It is, therefore, a general object of the present invention to provide an adjustable tool mounting adapter which overcomes the difficulties of prior constructions including those enumerated above.

It is a principal object of the present invention to provide an adjustable tool mounting adapter which maintains the chuck or other attachment in exact parallel alignment, but yet is adjustable radially.

It is another object of the present invention to provide a construction of an adjustable tool mounting adapter which eliminates the necessity of any heavy clamping bolts to maintain its adjusted position.

It is still another object of the present invention to provide a construction of adjustable tool mounting adapter which is readily adaptable to any type of machine tool and chuck or other attachment.

It is a further object of the present invention to provide an adjustable tool mounting adapter with which extremely close radial alignment may be obtained.

It is still a further object of the present invention to provide an adjustable tool mounting adapter which adjusts smoothly and easily where close tolerances are required.

Additionally, it is an object of the present invention to provide an adjustable tool mounting adapter which may be adjusted to any desired degree of eccentricity and will remain in such predetermined adjustment for any number of workpieces.

Finally, it is an object of the present invention to provide a construction of adjustable tool mounting adapter which accomplishes all of the above objects in an effective and efficient manner, but yet is simple in construction and economical to manufacture.

These and other objects are accomplished by the parts, constructions, arrangements, combinations and subcombinations comprising the present invention, the nature of which is set forth in the following general statement, preferred embodiments of which—illustrative of the best mode in which applicant has contemplated applying the principles—are set forth in the following description and illustrated in the accompanying drawings, and which are particularly and distinctly pointed out and set forth in the appended claims forming a part hereof.

In general terms the improved adjustable tool mounting adapter constituting the present invention may be stated as including a machine mounting portion, a tool mounting portion, the tool mounting portion having a smaller diameter than the machine mounting portion, an adjusting collar having an axially extending flange portion, radially spaced adjusting means mounted in the flange portion, the adjusting collar slidably mounted on the machine mounting portion with the flange portion extending axially over the tool mounting portion, and floating tool attaching means mounted on the tool mounting portion, whereby a tool such as a chuck or other attachment may be attached to the floating tool attaching means with a portion of the tool extending beneath the adjusting collar flange portion and with the end of the tool closely abutting the larger diameter machine mounting portion, and the adjusting means on the adjusting collar may be adjusted to place the tool in exact radial alignment, while the machine mounting portion retains the tool in exact parallel alignment.

More specifically, one form of the improved adjustable tool mounting adapter constituting the present invention may be stated as including a cylindrical machine mounting portion having an axially extending threaded bore formed centrally therein, a cylindrical tool mounting portion, the tool mounting portion axially aligned with and having a smaller diameter than the machine mounting portion, an adjusting collar having an axially extending flange portion and a radially inwardly extending flange portion, four equally spaced radially extending adjusting screws threadably mounted in the axially extending flange portion, the adjusting collar slidably mounted over the machine mounting portion with the axially extending flange portion and the set screws mounted therein extending over the tool mounting portion and the radially inwardly extending flange portion radially abutting the machine mounting portion, an annular tool attaching collar having an outer threaded chuck mounting surface and a slot formed at one of the ends thereof, the adapter collar mounted surrounding and radially spaced from the tool mounting portion and axially spaced from the machine mounting portion, an axially extending stop pin solidly mounted in the machine mounting portion engaged in the slot in the tool attaching collar, and a snap ring mounted on the tool mounting portion radially abutting the end of the tool attaching collar opposite said one end, whereby a tool such as a chuck or other attachment may be threadably mounted on the stool attaching collar with a portion of the tool extending beneath the axially extending adjusting collar flange portion and with the end of the tool closely abutting the radially extending adjusting collar flange portion forcing this radially extending flange portion tightly against the machine mounting portion, and the set screws in the adjusting collar may be tightened against the tool causing the tool attaching collar to move radially in reference to the tool mounting portion and the end of the tool to remain tightly abutting the radially extending flange on the adjusting collar but to slide radially in reference thereto, and the tool may thereby be adjusted radially to place it in exact radial alignment and still be retained in exact parallel alignment.

By way of example, embodiments of the improved adjustable tool adapter of the present invention are illustrated in the accompanying drawings forming a part hereof, wherein like numerals indicate similar parts throughout the several views, and in which.

Figure 1:
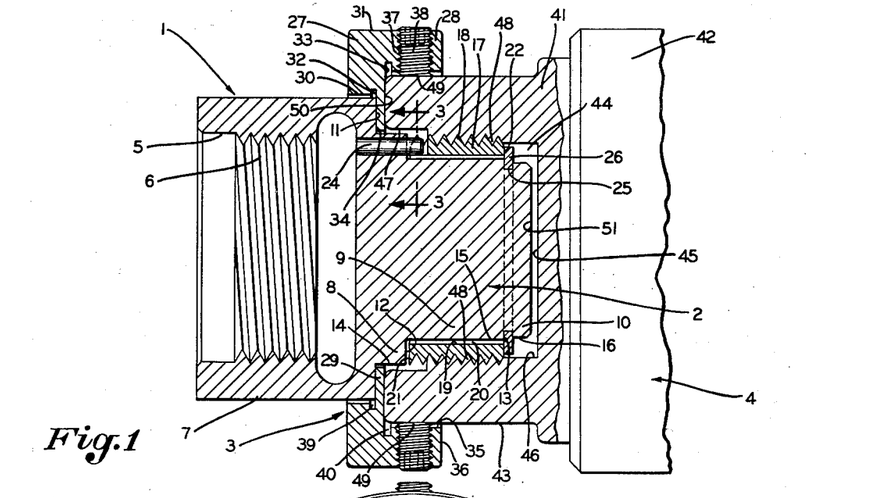
Fig. 1 is a side view, part in section and part in elevation, showing a cross-section of the adapter with a typical chuck mounted thereon.
Figures 2, 3:
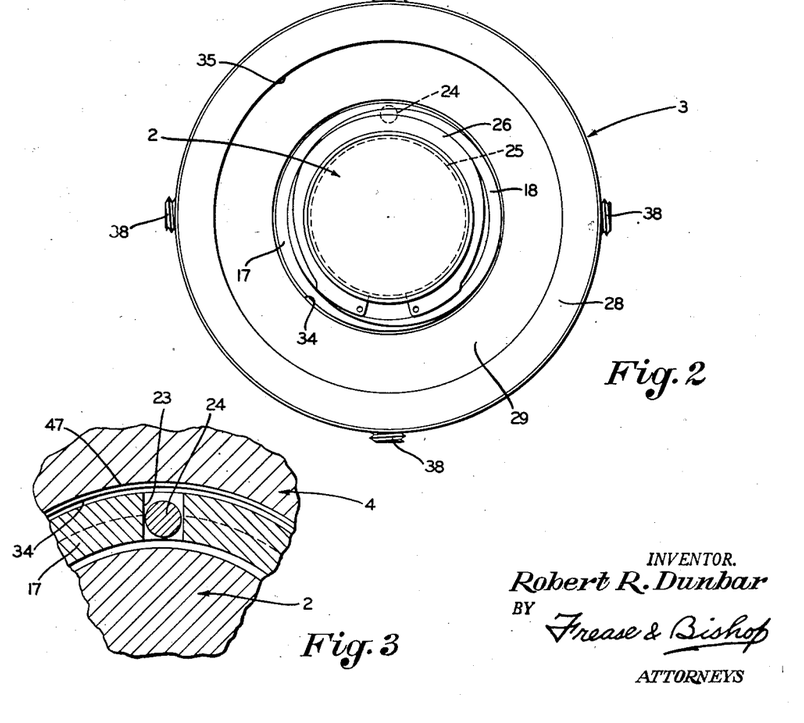
Fig. 2, an end elevation of the adapter looking at the tool mounting end.
Fig. 3, a fragmentary sectional view looking in the direction of the arrows 3—3 in Fig. 1.

The adjustable tool mounting adapter of the present invention includes a machine mounting portion generally indicated at 1, a tool mounting portion generally indicated at 2 and an adjusting collar generally indicated at 3, and is illustrated in the drawings and described herein having a typical tool, in this illustration a chuck generally indicated at 4 mounted thereon. All of the metal parts of the adapter are preferably formed from steel.

The machine mounting portion generally indicated at 1 is preferably cylindrical in configuration having a circular bore 5 formed centrally therein extending over the greater portion of its length. The threads 6 are formed practically over the length of the bore 5 and serve to attach the mounting portion 1 to a machine tool spindle (not shown). The mounting portion 1 also preferably includes the outer annular circumferential surface 7.

The tool mounting portion generally indicated at 2 also is generally cylindrical in configuration and includes the enlarged diameter portion 8 abutting the machine mounting portion 1, then the reduced diameter portion 9 and the nose portion 10. Nose portion 10 has a diameter preferably smaller yet than the portion 9, as shown.

The tool mounting portion 2 is axially aligned with the machine mounting portion 1 and is preferably formed integrally therewith. The outer diameter of the enlarged diameter portion 8 is an amount less than the outer diameter of the machine mounting portion 1, thereby forming the radial end abutment surface 11 on the machine mounting portion 1.

In like manner, the reduced diameter portion 9 has a smaller outside diameter than the enlarged diameter portion 8 forming the radial end surface 12 on this enlarged diameter portion 8. Also, in like manner, the nose portion 10 is of smaller diameter than the reduced diameter portion 9 forming the radial end surface 13. Portions 8, 9 and 10 have outer annular circumferential surfaces 14, 15 and 16 respectively, which surfaces are preferably parallel to the axis of the adapter.

The floating tool attaching collar 17 is preferably of hollow cylindrical configuration having an axial length slightly smaller than the axial length of the reduced diameter portion 9. Collar 17 has engagement threads 18 formed on its outer surface extending its entire length and said collar is mounted surrounding the reduced diameter portion 9 with its inner annular circumferential surface 19 being of a diameter larger than the outer surface 15 of portion 9. Thus, the inner surface 19 of the floating tool attaching collar 17 is spaced from the outer surface 15 of the reduced diameter portion 9, providing an adjusting space 20 therebetween.

The attaching collar 17 also includes an inner radial end surface 21 and an outer radial end surface 22 and the stop pin slot 23 is formed in the inner end surface 21 opening towards the radial end surface 12 of the enlarged diameter portion 8. Stop pin 24 is mounted in the machine mounting portion 1 and extends axially through the enlarged diameter portion 8 of the tool mounting portion 2, projecting through the radial end surface 12 and into and engaged with the stop pin slot 23 in the attaching collar 17.

The diameter of pin 24 is less than the width of the slot 23 and slot 23 extends completely through the radial thickness of the attaching collar 17. Thus, the attaching collar 17 is permitted complete radial freedom of movement limited only by the amount of adjusting space 20 between inner surface 19 of the collar 17 and the outer surface 15 of the portion 9. At the same time, the collar 17 is prevented from rotating in reference to the portion 9.

The nose portion 10 has an annular snap ring groove 25 formed in its outer surface 16, which groove extends from the radial end surface 13 of the reduced diameter portion 9 axially outwardly. The snap ring 26 is engaged in the slot 25 abutting the radial end surface 13 and extending radially outwardly abutting the outer radial end surface 22 of the attaching collar 17. Thus, the attaching collar 17 is retained in assembly surrounding the reduced diameter portion 9 by the radial end surface 12 of portion 8 and the snap ring 26 engaged in the groove 25.

The adjusting collar generally indicated at 3 is shown herein separate, but could be integral of portion 1, and includes a mounting portion 27, an axially extending flange portion 28 and a radially extending abutment flange portion 29. The mounting portion 27 circumferentially surrounds the outer annular circumferential surface 7 of the machine mounting portion 1 and has an axially extending inner annular circumferential surface 30 and an outer axially extending annular circumferential surface 31.

Surface 30 closely abuts the outer surface 7 of the machine mounting portion 1 with the only clearance provided therebetween being that sufficient to accomplish assembly of these two surfaces. The outer surface 31 extends preferably axially, thereby also forming the outer circumferential surface of the flange portion 28.

Radially extending flange portion 29 is formed integrally with the mounting portion 27 and extends radially inwardly from portion 27 with its inner radial abutment surface 32 closely abutting the radial end abutment surface 11 of machine mounting portion 1. Flange portion 29 also includes an outer radial abutment surface 33 which is formed parallel to the inner radial surface 32, while the inner annular end surface 34 circumferentially surrounds and is spaced from the outer surface 14 of the enlarged diameter portion 8.

It is preferable in the construction comprising the present invention that the outer annular surface 7 and the radial end surface 11 of the machine mounting portion 1 are formed closely perpendicular to each other and also that the inner annular surface 30 and the inner radial surface 32 of the adjusting collar 3 are formed closely perpendicular. It is further preferable that the radial surfaces 32 and 33 of the adjusting collar 3 are formed closely parallel to each other, and also as before described, that the outer annular surface 7 of portion 1 fits very closely abutting inner annular surface 30 of the collar 3. With these surfaces so formed, the optimum results of the present invention will be obtained.

The axially extending flange portion 28 extends axially from the radial surface 33 of the radially extending flange portion 29 extending away from the machine mounting portion 1, thereby, partially overlying the tool mounting portion 2. Flange portion 28 includes the outer annular circumferential surface 31, as before described, and the inner annular circumferential surface 35 and the flange terminates axially in a preferably radially extending end surface 36. Surface 36 is preferably perpendicular to surfaces 31 and 35 and surfaces 31 and 35 are preferably parallel to each other and parallel to the axis of the collar 3.

The collar 3 has preferably radially extending threaded holes 37 formed between the outer annular surface 31 and the inner annular surface 35. Holes 37 are preferably equally spaced around the circumference of the collar 3 and are preferably four in number. The threaded set screws 38 are received in the holes 37 to serve as adjusting screws for a purpose to be hereinafter described.

The usual machining relief 39 is provided between the inner annular surface 30 and the radial surface 32 of the collar 3. Also, the usual machining relief 40 is provided between the inner annular surface 35 and the radial surface 33. Reliefs 39 and 40 are merely for convenience of machining and are not important to the first embodiment of the invention shown.

The typical tool in the form of a chuck generally indicated at 4 includes a mounting portion 41 and a workpiece attaching portion 42. The attaching portion 41 is formed with an outer annular circumferential surface 43 and has an axially extending circular bore 44 formed therein. Bore 44 includes the preferable radial bottom surface 45, a small diameter inner annular circumferential surface 46 and an enlarged diameter inner annular circumferential surface 47.

Inner surface 46 has preferably threads 48 formed thereon spaced from the bottom surface 45 and extending the greater portion of its length. Engagement threads 48 are matching threads to the engagement threads 18 on the floating tool attaching collar 17 so that the chuck 4 may be threadably received over the attaching collar 17.

The workpiece attaching portion 42 of the chuck 4 includes the usual workpiece attaching means (not shown). This attaching means may be of any usual type, but, as before stated, for the best results in the use of an adapter between a machine tool spindle and a chuck, the workpiece attaching means would be preferably of the fixed center type.

In operation the adjustable tool mounting adapter comprising the present invention is mounted on the spindle of a machine tool by means of the threads 6 in the machine mounting portion 1. When so assembled, the adjusting collar 3 is mounted surrounding the machine mounting portion 1 with the outer surface 7 of portion 1 closely abutting the inner surface 30 of collar 3, and with radial surface 11 of portion 1 closely abutting radial surface 32 of collar 3. Also, set screws 38 of collar 3 are in retracted position so that the end surfaces 49 of these set screws are flush with the inner surface 35.

The chuck 4 is then threadably received over the floating tool attaching collar 17 and drawn up tightly thereon so that the radially extending end surface 50 closely abuts the radial surface 33 of the adjusting collar 3. It is important that the end surface 50 be closely perpendicular to the axis of the chuck 4 and may, thusly, be drawn up closely parallel to the radial surfaces 32 and 33 of the adjusting collar 3.

As the radial end surface 50 of the chuck 4 tightly abuts the radial surface 33 of collar 3, the floating tool attaching collar 17 will be drawn tightly abutting the snap ring 26 as shown. Stop pin 24 is of sufficient length to remain engaged at all times in the stop pin slot 23 of the floating collar 17 so that collar 17 may not rotate in reference to the tool mounting portion 2. Thus, the threaded engagement between the adapter and the chuck 4 may be accomplished.

When the chuck 4 is in mounted position on the adapter, the enlarged diameter surface 47 of the chuck 4 provides clearance between the surface 14 and the floating collar 17 as shown, and the small diameter surface 46 of the chuck 4 provides clearance between the surface 16 and the snap ring 26 of the mounting portion 2 as shown. Further, the end surface 51 of the adapter portion 8 is spaced from the bottom surface 45 of the chuck 4.

When the chuck 4 is so mounted with the end abutment surface 50 tightly abutting the radial abutment surface 33 of the adjusting collar 3, the set screws 38 may be screwed radially inwardly until their end surfaces 49 abut the outer surface 43 of the chuck 4. As the set screws 38 bear against the chuck 4, the end surface 50 of chuck 4 and the radial surface 33 of adjusting collar 3, although tightly abutting, will slide upon each other. Such movement between the chuck 4 and the adjusting collar 3 is permitted by the before described adjusting space 20 provided between the inner surface 19 of the floating tool attaching collar 17 and the outer surface 15 of the tool mounting portion 2.

Thus, the chuck 4 may be adjusted into exact concentricity or radial alignment, while the parallel radial abutment surfaces 11, 32 and 33 of the adapter and the end abutment surface 50 of the chuck 4 maintain the chuck 4 in exact parallel alignment. Further, the chuck 4 may be adjusted to any degree of eccentricity as so desired, while the same cooperating parts again maintain this parallel alignment.

It should be understood that the threads 6 of the machine mounting portion 1, the threads 18 of the floating collar 17 and the threads 48 of the chuck 4 may be other attaching means, such as, for instance, tapers. Further, the set screws 38 could be other adjusting means such as micrometer screws. Still further, the various elements such as the machine mounting portion 1, the adjusting collar 3 and the floating attaching collar 17 may be changed in configuration to suit the particular machine tool spindle upon which the adapter is to be mounted and the particular chuck or other attachment which is to be mounted thereon. All of these various changes and substitutions as well as other design changes may be made without departing from the principles of the present invention.

Figures 4, 5, 6, 7, 8:
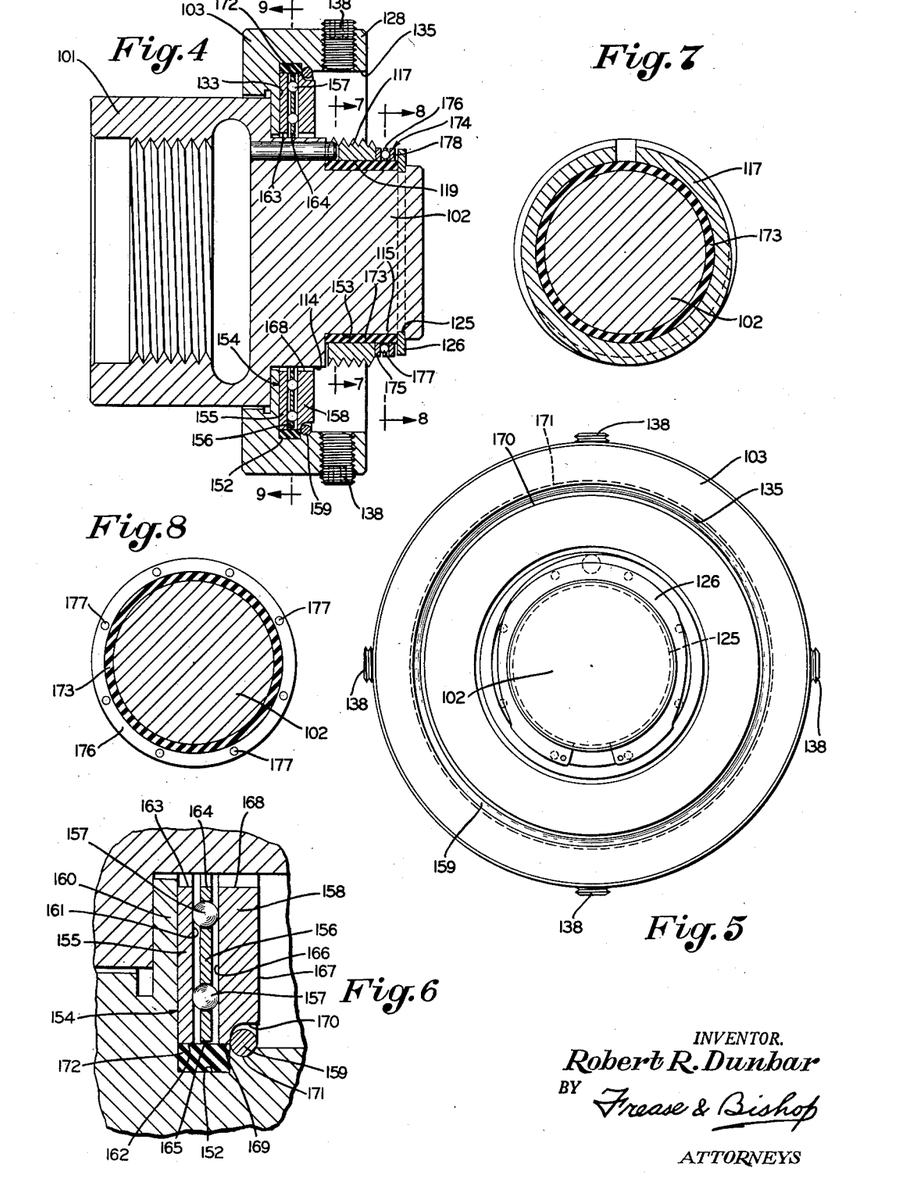
Fig. 4, a side sectional view showing a cross-section of a second embodiment of the adapter.
Fig. 5, an end elevation of the adapter in Fig. 4 looking at the tool mounting end.
Fig. 6, an enlarged fragmentary sectional view taken from the view of Fig. 4 showing the tool thrust ring and mounting arrangement thereof.
Fig. 7, a sectional view looking in the direction of the arrows 7—7 in Fig. 4.
Fig. 8, a sectional view looking in the direction of the arrows 8—8 in Fig. 4.
Figure 9:
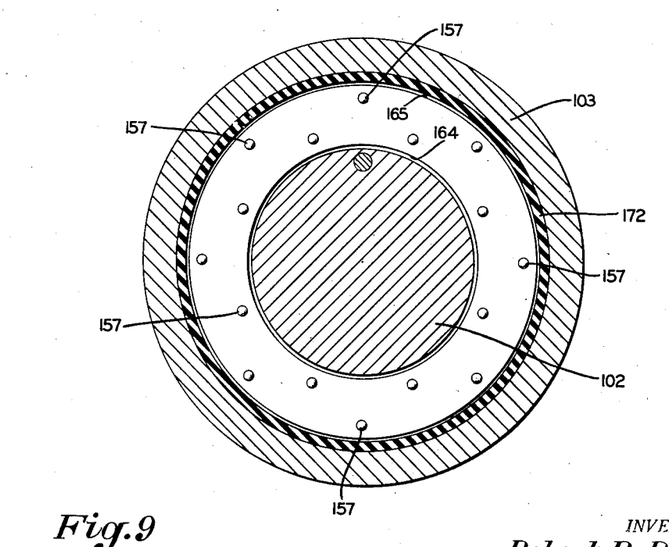
Fig. 9, a sectional view looking in the direction of the arrows 9—9 in Fig. 4.

The second embodiment of the present invention includes a similarly formed adapter with modifications therein to provide a tool thrust ring, a floating tool attaching collar thrust ring, resilient means between the outer surface of the tool thrust ring and the inner surface of the adjusting collar and resilient means between the floating tool attaching collar and the tool mounting portion of the adapter.

The adapter in the second embodiment includes the similar elements of a machine mounting portion 101, a tool mounting portion 102 and an adjusting collar 103. The adjusting collar 103 has the radial abutment surface 133, the inner annular circumferential surface 135 and threaded set screws 138. Further, the tool mounting portion 102 has the outer annular circumferential surfaces 114 and 115, the snap ring groove 125 and the snap ring 126.

In this case, the machining relief between the radial surface 133 and the circumferential abutment surface 135 of the adjusting collar 103 is increased in size to form the mounting groove 152. Further, a mounting groove 153 is provided in the outer circumferential surface 115 of the tool mounting portion 102 partially surrounded by the floating tool attaching collar 117 thereby providing a greater clearance between the inner annular circumferential surface 119 of collar 117 and the outer surface 115 of the attaching portion 102. Still further, the floating collar 117 is of less axial length providing clearance between collar 117 and the snap ring 126. Also, to provide for the added elements of the second embodiment, it is preferable to increase the axial length of the axially extending flange portion 128 of the adjusting collar 103.

The tool thrust ring generally indicated at 154 preferably includes the inner hardened plate 155, the thrust ball ring 156, the thrust balls 157, the outer hardened plate 158 and the retaining ring 159. The inner hardened plate 155 has preferably radially extending parallel side surfaces 160 and 161 with an outer annular circumferential surface 162 and an inner annular circumferential surface 163. Inner surface 163 is preferably spaced from the outer surface 114 of the mounting portion 102 and the outer surface 162 is preferably spaced from the inner surface 135 of the adjusting collar 103.

The thrust ball ring 156 may be any usual ball retaining means and has mounted therein the thrust balls 157. Thrust balls 157 are mounted in ring 156 so that they may freely rotate in reference to ring 156, but still will remain engaged therewith. Ring 156 is also preferably provided with an inner annular circumferential surface 164 spaced from the outer surface 114 of the mounting portion 102 and an outer annular circumferential surface 165 spaced from the inner surface 135 of the adjusting collar 103.

Outer hardened plate 158 similar to plate 155 includes radially extending parallel side surfaces 166 and 167, an inner annular circumferential surface 168 and an outer annular circumferential surface 169. The inner surface 168 is spaced from the outer surface 114 of the mounting portion 102 and the outer surface 169 is spaced from the inner surface 135 of the adjusting collar 103. The outer surface 169 of plate 158 is provided with an annular arcuate retaining ring groove 170 which extends from the outer side surface 167 inwardly, with the inner surface 135 of the adjusting ring 103 also provided with an annular arcuate retaining ring groove 171 extending from the mounting groove 152 outwardly.

In assembly, an annular resilient ring 172 of preferably rubber is mounted in the mounting groove 152 extending outwardly beyond the surface 135 of the adjusting ring 103. The inner hardened plate 155 is mounted abutting the outer radial surface 133 of the adjusting collar 103 with the outer surface 162 abutting the resilient ring 172 and with the inner surface 163 spaced from the outer surface 114 of the mounting portion 102. The thrust ball ring 156 is mounted so that the balls 157 abut the outer radial surface 161 of plate 155 with the outer surface 165 abutting the resilient ring 172 and the inner surface 164 spaced from the outer surface 114 of the mounting portion 102.

The plate 158 is mounted with its inner radial surface 166 abutting the thrust balls 157, the outer surface 169 abutting the resilient ring 172 and the inner surface 168 spaced from the outer surface 114 of the mounting portion 102. The retaining ring 159, which is preferably an O-ring, is received in the groove 170 of plate 158 and groove 171 in surface 135 of the adjusting collar 103 so that ring 159 retains plate 155, thrust ball ring 156, thrust balls 157, plate 158 and resilient ring 172 properly assembled in the adapter.

Resilient ring 173, of preferably rubber, is received in the mounting groove 153 formed in the outer surface 115 of the mounting portion 102 so that it abuts the inner annular circumferential surface 119 of the floating collar 117 and extends from the inner end of surface 115 to the snap ring 126. A tool attaching collar thrust ring 174 is mounted surrounding the portion of resilient ring 173 between the floating collar 117 and the snap ring 126. Thrust ring 174 includes an inner hardened plate 175, a thrust ball ring 176, thrust balls 177 and an outer hardened plate 178.

Plates 175 and 178 are preferably annular plates having sides perpendicular to the axis of the adapter with plate 175 abutting the radial side of collar 117 and the plate 178 abutting the snap ring 126. The thrust ball ring 176 containing the thrust balls 177 rotatably mounted therein is positioned between plate 175 and plate 178 so that the balls 177 abut these plates. Plates 175 and 178 and ring 176 are formed having a sufficient inside diameter so that clearance is provided between these plates and ring and the outer surface 115 of the portion 102, thereby allowing limited radial movement of this thrust ring assembly.

Thus, with the construction shown in the second embodiment, a chuck or other attachment (not shown) may be threadably received over the floating attaching collar 117 and drawn up so that the end of the chuck abuts the radial surface 167 of the hardened plate 158, thereby forcing the floating collar 117 tightly abutting the hardened plate 175 and forcing the hardened plate 178 tightly abutting the snap ring 126. As the set screws 138 are moved radially inwardly to abut the outer surface of the chuck and the chuck is thereby brought into radial alignment or concentricity, the floating collar 117 will compress the resilient cushioning ring 173 at portions thereof as required and will also cause the hardened plate 175 which tightly abuts the collar 117 to move on the thrust balls 177 thereby also radially moving the thrust ball ring 176 causing both rings 175 and 176 to compress ring 172 as required. Also, the end of the chuck positioned in tight abutment relationship against the hardened plate 158 will cause plate 158 to move radially on the thrust balls 157 causing thrust ball ring 156 to move radially so plate 158 and ring 156 compress the resilient cushioning ring 172 as required.

With such a construction it is possible to obtain very fine adjustment of the chuck or other attachment in relation to the adapter, since the tool thrust ring 154 and the attaching collar thrust ring 174 provide easy and smooth movement of the chuck even though there is considerable axial force of the end of the chuck against the hardened plate 158 and the end of the floating collar 117 against the hardened plate 175.

The prime purpose of the resilient cushioning rings 172 and 173 is to provide approximate centering of the chuck thrust ring 154 and the floating collar 117 when the chuck is removed therefrom. Also, these cushioning rings will provide somewhat smoother adjustment of the chuck on the adapter. It should be understood, however, that these cushioning rings may be eliminated or may be made from other materials or of other constructions with the prime requirement being that they are resilient.

Further, the radial surface 160 of the collar 103 may be hardened and the end surface of the chuck may be hardened, thereby, eliminating the requirement for the hardened plates 155 and 158 in the thrust ring 154 since the only requirement for these hardened plates is so that the thrust balls 157 will not score the surfaces against which they bear, thereby, preventing them from rotating and providing radial movement between the chuck or other attachment and the adapter. In like manner, the floating collar 117 and the snap ring 126 may be hardend, thereby, eliminating the necessity for hardened plates 175 and 178. It can be seen also that rollers or other means providing ease of radial movement could be substituted for the thrust balls in both of the thrust rings.

As illustrated in the drawings, it is preferable that the thrust ring 154 includes two circumferential rows of thrust balls 157 and the thrust ring 174 includes one circumferential row of thrust balls 177. It is apparent, however, that thrust ring 154 could include one or three or more circumferential rows of thrust balls 157 and thrust ring 174 two or more circumferential rows of thrust balls 177.

Thus, there is provided in the second embodiment an adapter which provides radial adjustment of a chuck or other attachment to move the chuck into perfect radial alignment or any desired degree of eccentricity, while at the same time, maintaining the chuck in close parallel alignment. Additionally, the radial adjustment is permitted in a smooth and precise movement. This construction is most advantageous for use where very close radial adjustment of the chuck or other attachment in reference to the machine tool spindle is required, say to one or two ten-thousandths of an inch, since any possible jerkiness of this radial adjustment is eliminated.

Figure 10:
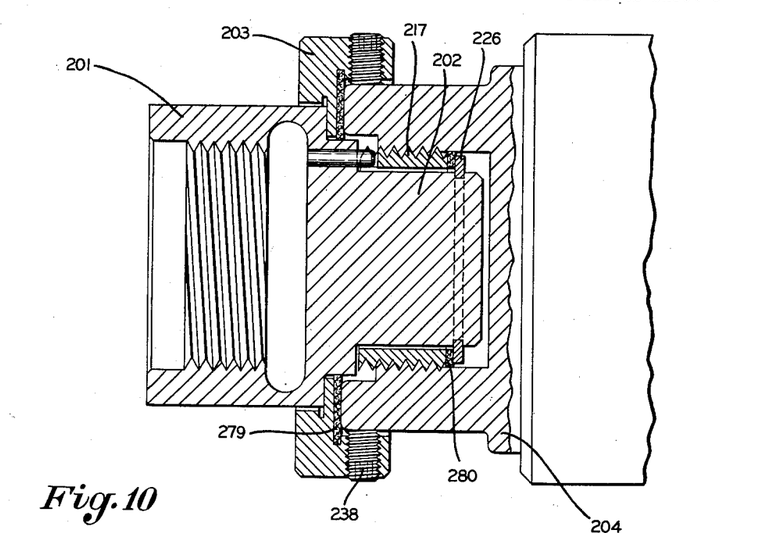
Fig. 10, a side view, part in section and part in elevation, showing a cross-section of a third embodiment of the adapter with a typical chuck mounted thereon.

The third embodiment of the present invention illustrated in Fig. 10 is similar to the first embodiment but provides some of the advantages of the second embodiment. That is, in the third embodiment, the thrust rings of the second embodiment are replaced by fiber rings or fiber washers.

The construction of the third embodiment similarly includes a machine mounting portion 201, a tool mounting portion 202, an adjusting collar 203, a floating tool attaching collar 217, a snap ring 226, set screws 238 and a typical chuck 204. The chuck 204 is similarly threadably received over the floating attaching collar 217.

In this case, however, a preferably fiber tool thrust ring 279 is positioned between the end of the chuck 204 and the adjusting collar 203. It is important that the radial sides of the fiber ring 279 be parallel to the radial surfaces on the chuck 204 and the adjusting collar 203 so that as the chuck 204 is assembled on the adapter, it will be maintained in close parallel alignment.

Further, in this case, clearance is provided between the floating collar 217 and the snap ring 226 and the fiber tool attaching collar thrust ring 280 is positioned therein. Again it is preferable that the radial sides of the thrust ring 280 be parallel to the radial sides of the floating collar 217 and the snap ring 226.

It is not imperative that the rings or washers 279 and 280 be fiber material, but may be of any relatively hard smooth surfaced material. Their purpose, as is the purpose of the thrust rings shown in the second embodiment and described above, is to provide smoother radial adjustment of the chuck 204 in reference to the adapter, and at the same time, help maintain the chuck 204 in close parallel alignment.

Figure 11:
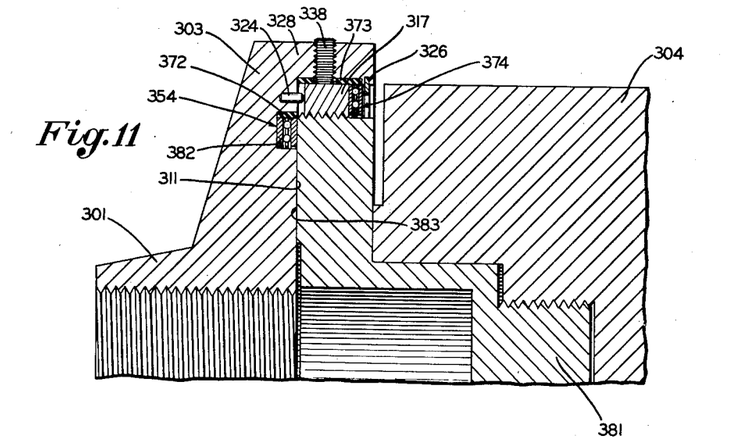
Fig. 11, a fragmentary sectional view showing a cross-section of a fourth emodiment of the adapter with typical tools mounted thereon.

The fourth embodiment of the present invention, illustrated in Fig. 11, incorporates the same general principles as the first three embodiments. In this embodiment, however, the adjusting collar is formed integrally with the machine mounting portion and the floating tool attaching collar is mounted spaced from and below the adjusting means on the adjusting collar so that a tool may be brought into threaded engagement with the internal surface of the floating collar, thereby eliminating the tool mounting portion of the adapter.

As shown in Fig. 11, the fourth embodiment similarly includes a machine mounting portion 301, an adjusting collar portion 303, a floating tool attaching collar 317, a stop pin 324, a snap ring 326, set screws 338, a chuck thrust ring 354, a resilient ring 372, a chuck attaching collar thrust ring 374, a resilient ring 373, a typical mounting plate 381 and a typical tool in the form of a chuck 304.

The adjusting collar portion 303 is again preferably formed with an axially extending flange portion 328 having the set screws 338 threadably received therethrough. The resilient ring 373 is mounted adjacent the inner periphery of flange portion 328 extending over the greater portion of the axial length of the flange 328, with ring 373 having holes formed therethrough in alignment with the set screws 338 to receive the ends of these set screws. The floating chuck attaching collar 317 is mounted adjacent the inner periphery of the resilient ring 373 so that the outer periphery of collar 373 is spaced from the inner periphery of the flange portion 328. Collar 317 is threaded internally over its entire axial length and is retained against rotation, as before, by a stop pin 324.

Chuck attaching collar thrust ring 374 abuts the outer radial surface of collar 317 and also abuts the inner peripheral surface of resilient ring 373, in similar arrangement as in the second embodiment. The snap ring 326 is mounted adjacent the outer radial surface of thrust ring 374 with the ring 326 extending radially outwardly, retaining the collar 317, resilient ring 373 and thrust ring 374 in assembly, as shown.

The adjusting collar 303, similar to the prior embodiments, is provided with a radial end abutment surface 311. This radial surface 311 is formed with an annular recess 382 and the chuck thrust ring 354 is received therein. The resilient ring 372 is also received in recess 382 abutting the outer periphery of thrust ring 354, as shown.

Thus, with the construction shown in the fourth embodiment, a typical mounting plate 381, having external threads formed thereon, may be threadably engaged with the inner periphery of floating collar 317 and positioned so that its radial end abutment surface 383 tightly abuts the inner radial end abutment surface 311 of the adjusting collar portion 303. Thereafter, the adjusting screws 338 may be engaged through the resilient ring 373 and against the outer peripheral surface of floating collar 317, and thus by selective adjustment, may position the mounting plate 381 in the desired radial position, while the inner radial end surface 311 on the adjusting collar portion 303 retains the mounting plate 381 in exact parallel alignment. Either prior to such adjustments or thereafter, a typical chuck or other attachment may be secured to the mounting plate 381, as illustrated in Fig. 11.

Figure 12:
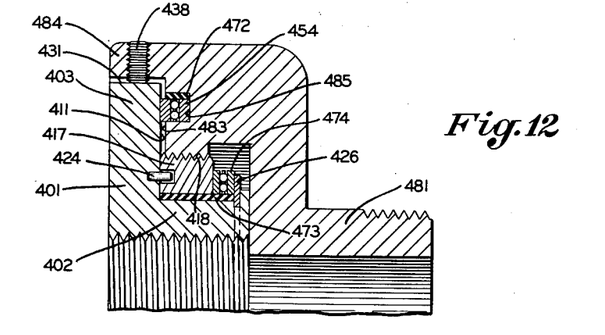
Fig. 12, a fragmentary sectional view showing a cross-section of a fifth embodiment of the adapter with a typical tool mounted thereon.

The fifth embodiment of the present invention, illustrated in Fig. 12, is most closely similar to the second embodiment, illustrated in Fig. 4. In this embodiment, however, the adjusting means and the axially extending flange portion are eliminated from the adjusting collar and placed on the mounting plate. In addition, slight modifications are made in the positioning of the thrust rings and floating tool attaching collar.

The construction of the fifth embodiment similarly includes a machine mounting portion 401, a radially extending collar 403, a floating tool attaching collar 417, a stop pin 424, a snap ring 426, set screws 438, a chuck thrust ring 454, a resilient ring 472, a chuck attaching collar thrust ring 474, a resilient ring 473 and a typical mounting plate 481.

The collar portion 403 is formed with an axially extending outer periphery or outer annular circumferential surface 431. The mounting plate 481 is formed with an annular axially extending flanged portion 484, with flange portion 484 overlying and spaced from surface 431, when the mounting plate 481 is mounted on the adapter. The inner radial surface of floating collar 417 abuts the radial end abutment surface 411 of the collar portion 403. Also, stop pin 424 engages between collar portion 403 and the floating collar 417 preventing rotation therebetween.

The adapter is again provided with a tool mounting portion 402 and the floating collar 417 circumferentially surrounds and is spaced from portion 402 with the resilient ring 473 positioned therebetween. Ring 473 also underlies the chuck attaching collar thrust ring 474, which thrust ring is positioned abutting the outer radial surface of floating collar 417. Snap ring 426 abuts the outer radial surface of thrust ring 474 and again retains the floating collar 417, resilient ring 473 and the thrust ring 474 in assembled position.

In this embodiment, the chuck thrust ring 454 is received in a recess 485 formed in the radial end surface 483 of the mounting plate 481, with the resilient ring 472 being also positioned in recess 485 abutting the outer periphery of thrust ring 454. Thrust ring 454 also abuts the outer radial end abutment surface 411 of the collar portion 403 when the mounting plate 481 and the adapter are in assembled position.

Thus, the mounting plate 481 may be threadably received by the threads 418 formed on the outer periphery of the floating tool attaching collar 417, so that the radial end abutment surface 483 of the mounting plate 481 closely abuts the end abutment surface 411 of the collar portion 403 retaining plate 481 in exact parallel alignment. As before stated, this positions the axially extending flange portion 484 on the mounting plate 481 axially overlying the outer periphery 431 of collar portion 403. The set screws 438, threadably received through the flange 484, may then be adjusted inwardly to abut surface 431, thereby permitting the mounting plate 481 to be selectively adjusted to a desired radial position.

Figure 13:
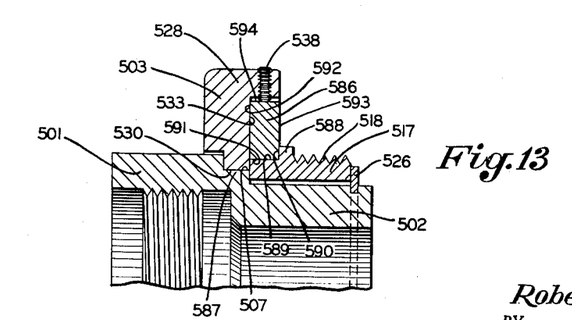
Fig. 13, a fragmentary sectional view showing a cross-section of a sixth embodiment of the adapter.

The sixth embodiment of the present invention, illustrated in Fig. 13, is similar to the first embodiment with the addition of an abutment ring. This construction includes a machine mounting portion 501, a tool mounting portion 502, an adjusting collar 503, a floating tool attaching collar 517, a snap ring 526, set screws 538 and the abutment ring 586.

The machine mounting portion 501 is provided with an offset 587 and the inner annular circumferential surface 530 of adjusting collar 503 is received therein, abutting the outer annular circumferential surface 507 of portion 501. Adjusting collar 503 is again provided with an axially extending flange portion 528 having adjusting means in the form of set screws threadably received radially therethrough. The outer radial abutment surface 533 of collar 503 extends radially inwardly to and abutting a portion of the inner radial surface of the floating collar 517. Floating collar 517 extends axially outwardly therefrom, and is spaced from the outer annular circumferential periphery of the tool mounting portion 502 with the snap ring 526 retaining it in proper assembly.

The outer periphery of the floating collar 517 is provided with the threads 518 extending from its outer end adjacent the snap ring 526 inwardly over a portion of its axial length. The pilot portion 588 is formed extending radially outwardly from collar 517 adjacent the inner end of the threads 518.

Floating collar 517 is formed in an axially extending annular circumferential surface 589 over the remainder of its length inwardly to its inner end, with the outer diameter of surface 589 being less than the outer diameter of the pilot portion 588, thereby providing an inner radial surface 590 on pilot portion 588. The abutment ring 586 is positioned with its inner axially extending circumferential surface 591 abutting the outer surface 589 on the floating collar 517 and with its inner side radial abutment surface 592 abutting the radial abutment surface 533 on adjusting collar 503, as shown in Fig. 13. Also, a portion of the outer radial abutment surface 593 abuts the inner radial surface 590 of the pilot portion 588. Thus, pilot portion 588 retains the abutment ring 586 in assembled position with its outer annular circumferential surface 594 spaced from the inner ends of the set screws 538, as shown.

In use of the construction shown in the sixth embodiment, a chuck or other attachment may be threadably received on the floating collar 517 so that the end radial surface of the chuck abuts the outer radial abutment surface 593 of abutment ring 586. By reason of their various before described constructions, the floating collar 517, during this attachment, may move axially tightly against the snap ring 526, while the radial end surface of the chuck will force the abutment ring 586 to move axially tightly abutting the radial abutment surface 533 of the adjusting collar 503. Thereafter, the set screws 538 may be selectively adjusted against the outer circumferential surface 594 of the abutment ring 586 moving the floating collar 517 and the chuck attached thereto radially, permitting the adjustment of the chuck to any desired radial position.

The abutment ring 586 is actually a working portion of the floating collar 517 and these two elements move together during the radial adjustment of a chuck or other attachment mounted on the floating collar 517. It is imperative, however, that ring 586 and collar 517 may move axially in relation to each other so that when a chuck or other attachment is threadably engaged and drawn up on collar 517, the radial end surface of this chuck may move the abutment ring 586 tightly against the radial surface 533 of the adjusting collar 503. Thus, ring 586 also serves as a portion of the radial abutment means between the adapted and a tool mounted thereon.

Thus, there has been herein described and illustrated a construction of adjustable tool mounting adapter which adapter maintains the chuck or other attachment in exact parallel alignment but yet permits the chuck or other attachment to be adjusted radially; which eliminates the necessity of any heavy clamping bolts to maintain its adjusted position; which is radially adaptable to any type of machine tool and chuck or other attachment therefor; with which extremely close radial alignment of the chuck or other attachment may be obtained; which adjusts smoothly and easily where close tolerances are required; which may be adjusted to any desired degree of eccentricity and will remain in such predetermined adjustment for any number of workpieces; and which accomplishes and contains all of the above enumerated advantageous features but yet is simple in construction and economical to manufacture.

Although the adapter of the present invention has been described herein in conjunction with chucks and mounting plates it should be understood that the construction may be changed to receive other machine tool attachments without departing from the principles of the present invention.

In the foregoing description, certain terms have been used for brevity, clearness and understanding, but no unnecessary limitations are to be implied therefrom, because such words are used for descriptive purposes herein, and are intended to be broadly construed.

Moreover, the embodiments of the improved construction illustrated and described herein are by way of example, and the scope of the present invention is not limited to the exact details of construction shown.

Having now described the invention, the construction, operation and use of preferred embodiments thereof, and the advantageous new and useful results obtained thereby; the new and useful construction and reasonable mechanical equivalents thereof obvious to those skilled in the art are set forth in the appended claims.

I claim:

1. Adjustable tool mounting construction including a rotatable mounting member, a floating member rotatable with the mounting member, the floating member being axially movable with respect to the mounting member and being mounted for limited shifting movement of its axis radially in respect to the axis of the mounting member, a tool member, means securing the tool member to the floating member, means for limiting axial movement of the floating member in a direction away from the mounting member and toward the tool member, abutment means associated with the mounting member and the tool member for maintaining the tool member in parallel alignment with the mounting member as the axis of the floating member is shifted in respect to the axis of the mounting member, and adjustable means reacting between at least two of said members movable to establish a predetermined relation between the axis of the mounting member and the axis of the tool member.

2. Adjustable tool mounting construction as defined in claim 1 in which the abutment means includes a radially extending surface on the mounting member and a radially extending surface on the tool member.

3. Adjustable tool mounting construction as defined in claim 1 in which the abutment means includes a radially extending surface on the mounting member, a radially extending surface on the tool member, and thrust bearing means positioned between said radially extending surfaces.

4. Adjustable tool mounting construction as defined in claim 1 in which the abutment means includes a radially extending surface on the mounting member, a radially extending surface on the tool member, and a relatively hard smooth-surfaced fiber ring positioned between said radially extending surfaces.

5. Adjustable tool mounting construction as defined in claim 1 in which the abutment means includes a radially extending surface on the mounting member, a radially extending surface on the tool member, an abutment ring positioned between said radially extending surfaces, and said abutment ring mounted on the floating member for axial movement in relation to said floating member and for movement with the floating member during said floating member limited shifting movement.

6. Adjustable tool mounting construction as defined in claim 1 in which the abutment means includes a radially extending surface on the mounting member, a radially extending surface on the tool member, and thrust bearing means positioned between said radially extending surfaces; and in which thrust bearing means is positioned between the floating member and the means for limiting axial movement of the floating member.

7. Adjustable tool mounting construction as defined in claim 1 in which the abutment means includes a radially extending surface on the mounting member, a radially extending surface on the tool member, and a first thrust bearing means positioned between said radially extending surfaces; in which a second thrust bearing means is positioned between the floating member and the means for limiting axial movement of the floating member; in which a first resilient means is positioned between the first thrust bearing means and the mounting member; and in which a second resilient means is positioned between the floating member and the second thrust bearing means, and the mounting member.

8. Adjustable tool mounting construction as defined in claim 1 in which the adjustable means reacts between the mounting member and the tool member.

9. Adjustable tool mounting construction as defined in claim 1 in which the adjustable means reacts between the mounting member and the floating member.

10. Adjustable tool mounting construction as defined in claim 1 in which the abutment means includes a radially extending surface on the mounting member, a radially extending surface on the tool member, an abutment ring positioned between said radial surfaces, and said abutment ring mounted on the floating member for axial movement in relation to said floating member and for movement with the floating member during said floating member limited shifting movement; and in which the adjustable means includes means reacting between the mounting member and the abutment ring transmitting said shifting movement between the mounting member and the floating member.

11. Adjustable tool mounting construction including a rotatable mounting member, a tool member, a floating member rotatable with one of said mounting and tool members, the floating member being axially movable with respect to said one member and being mounted for limited shifting of its axis radially in respect to the axis of said one member, means securing the other of said mounting and tool members to the floating member, means for limiting axial movement of the floating member in a direction away from said one of the mounting and tool members and toward said other of said members, abutment means associated with the mounting member and the tool member for maintaining the tool member in parallel alignment with the mounting member as the axis of the floating member is shifted in respect to the axis of the said one of the mounting and tool members, and adjustable means reacting between at least two of the mounting and tool and floating members movable to establish a predetermined relation between the axis of the mounting member and the axis of the tool member.

12. Adjustable tool mounting construction as defined in claim 11 in which the abutment means includes a radially extending surface on the mounting member and a radially extending surface on the tool member.

13. Adjustable tool mounting construction as defined in claim 11 in which the abutment means includes a radially extending surface on the mounting member, a radially extending surface on the tool member, and thrust means positioned between said radially extending surfaces.

14. Adjustable tool mounting construction as defined in claim 11 in which the abutment means includes a radially extending surface on the mounting member, a radially extending surface on the tool member, and a relatively hard smooth-surfaced fiber ring positioned between said radially extending surfaces.

15. Adjustable tool mounting construction as defined in claim 11 in which the abutment means includes a radially extending surface on the mounting member, a radially extending surface on the tool member, an abutment ring positioned between said radially extending surfaces, and said abutment ring mounted on the floating member for axial movement in relation to said floating member and for movement with the floating member during said floating member limited shifting movement.

16. Adjustable tool mounting construction as defined in claim 11 in which the abutment means includes a radially extending surface on the mounting member, a radially extending surface on the tool member, and thrust bearing means positioned between said radially extending surfaces; and in which thrust bearing means is positioned between the floating member and the means for limiting axial movement of the floating member.

17. Adjustable tool mounting construction as defined in claim 11 in which the abutment means includes a radially extending surface on the mounting member, a radially extending surface on the tool member, and a first thrust bearing means positioned between said radially extending surfaces; in which a second thrust bearing means is positioned between the floating member and the means for limiting axial movement of the floating member; in which a first resilient means is positioned between the first thrust bearing means and one of said mounting and tool members; and in which a second resilient means is positioned between the floating member and the second thrust bearing means, and said one of the mounting and tool members with which the floating members is rotatable.

18. Adjustable tool mounting construction as defined in claim 11 in which the adjustable means reacts between the mounting member and the tool member.

19. Adjustable tool mounting construction as defined in claim 11 in which the adjustable means reacts between said other of the mounting and tool members which is secured to the floating member and the floating member.

20. Adjustable tool mounting construction as defined in claim 11 in which the abutment means includes a radially extending surface on the mounting member, a radially extending surface on the tool member, an abutment ring positioned between said radial surfaces, and said abutment ring mounted on the floating member for axial movement in relation to said floating member and for movement with the floating member during said floating member limited shifting movement; and in which the adjustable means includes means reacting between said one of the mounting and tool members with which the floating member is rotatable and the abutment ring transmitting said shifting movement between said one member and the floating member.

References Cited in the file of this patent

UNITED STATES PATENTS

| | | |
|---|---|---|
| 1,330,998 | Bolender | Feb. 17, 1920 |
| 2,524,468 | Ouimette | Oct. 3, 1950 |
| 2,639,157 | Buck et al. | May 19, 1953 |

FOREIGN PATENTS

| | | |
|---|---|---|
| 60,084 | Austria | July 10, 1913 |